No. 639,529. Patented Dec. 19, 1899.
W. H. COOK.
PROCESS OF AND APPARATUS FOR COOKING COTTON SEED.
(Application filed Sept. 13, 1898.)
(No Model.)
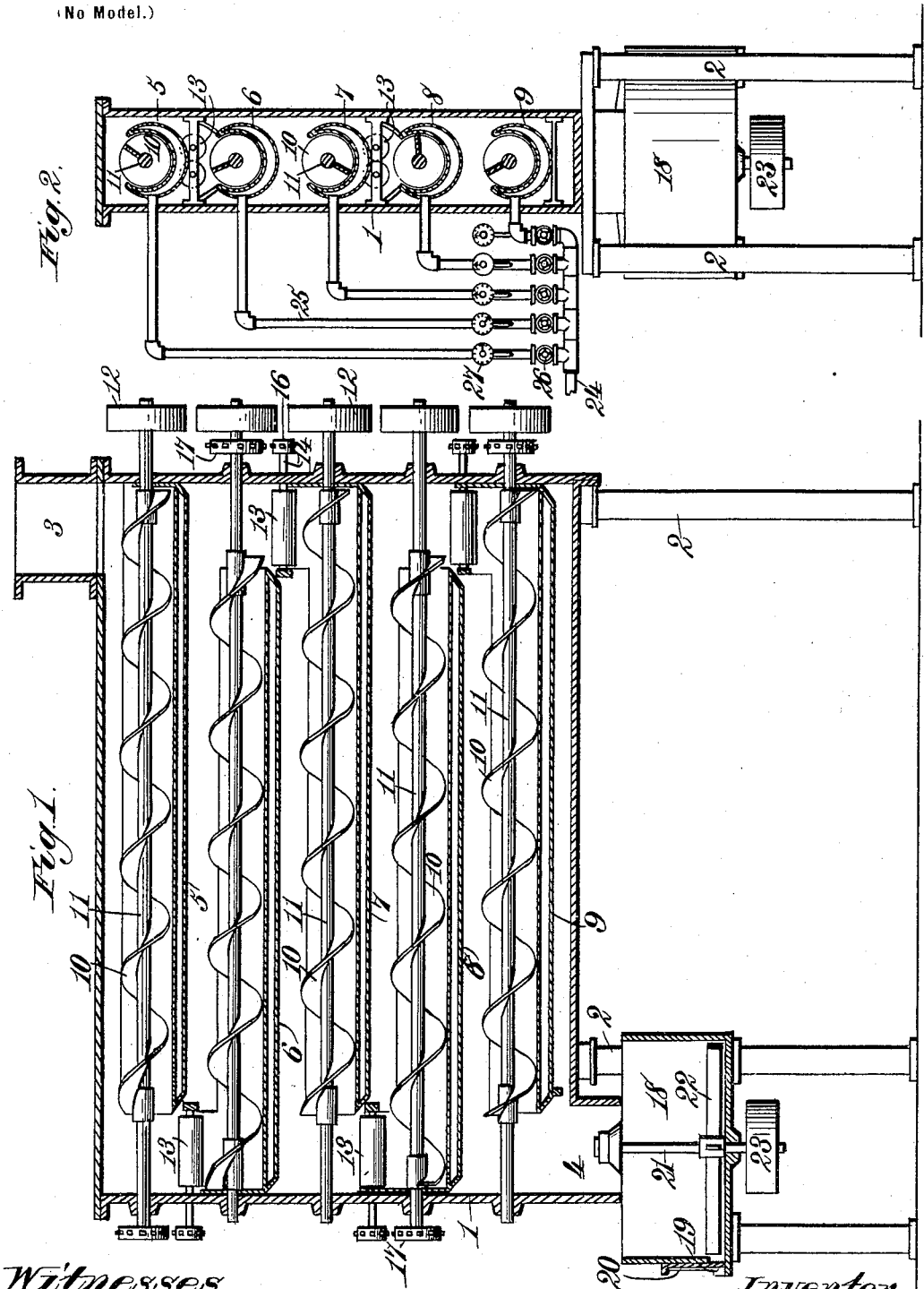
Witnesses,
Inventor:
Walter H. Cook.
By James L. Norris
Atty.

UNITED STATES PATENT OFFICE.

WALTER H. COOK, OF NEW ORLEANS, LOUISIANA.

PROCESS OF AND APPARATUS FOR COOKING COTTON-SEED.

SPECIFICATION forming part of Letters Patent No. 639,529, dated December 19, 1899.

Application filed September 13, 1898. Serial No. 690,871. (No model.)

*To all whom it may concern:*

Be it known that I, WALTER H. COOK, a citizen of the United States, residing at New Orleans, in the parish of Orleans and State of Louisiana, have invented new and useful Improvements in Processes of and Apparatus for Cooking Cotton-Seed, of which the following is a specification.

My invention consists of an improved process for cooking cotton-seed and of certain improvements in cooking apparatus whereby it is carried out. The same will be set forth in detail in the following description and the novel features thereof pointed out in the claims.

In the drawings, Figure 1 is a vertical sectional view of my improved cooker; and Fig. 2 is a view thereof in end elevation, partly in section.

My improved process consists in subjecting the cotton-seed to a gradually-increasing heat and crushing the same during the heating operation. The apparatus by which this process may be carried out consists of a closed upright rectangular casing 1 of any approved or preferred construction and suitably supported in an elevated position upon standards 2. An inlet 3 is provided at one end of the top of the casing 1, and an outlet 4 is provided at the opposite end of the bottom. Fixed longitudinally in the casing one above the other is a plurality of partially-cylindrical troughs 5, 6, 7, 8, and 9, provided with crescent-shaped steam-jackets, and arranged to rotate in said troughs are spiral conveyers 10, each of which is fixed on a shaft 11, journaled in suitable bearings at the opposite ends of the casing, and each of said shafts has fixed on one end a sprocket wheel or pulley 12, whereby all the spiral conveyers are adapted to be driven at a uniform speed by a single chain or belt. (Not shown.) The spiral conveyers in practice are geared together by the drive chain or belt in such manner that each conveyer is caused to rotate in a direction opposite to the conveyer next below, and the troughs are arranged in such manner that the rear end of each trough terminates at a point immediately above the front end of the one next below, the arrangement being such that the seed is moved along each trough from its front to its rear end and is discharged onto the front end of the trough next below. Journaled in pairs in the opposite ends of the casing 1 are crushing-rolls 13, there being one such pair of rolls arranged beneath the rear end of each trough, as shown, whereby the seed as it is discharged from each trough is caused to pass between a pair of rolls before dropping onto the trough beneath. Each roll 13 is fixed on a shaft 14, journaled in the end of the casing 1, and on a suitable cross-bar 15 and has fixed on its outer end a chain wheel or pulley 16, the chain wheels or pulleys of each pair of rolls being connected by a chain or belt to a corresponding chain wheel or pulley 17, fixed on the end of the adjacent conveyer-shaft.

Arranged beneath the outlet 4 of the casing 1 is a receiver 18, consisting of a vat or tank open at its upper end and provided at its lower end upon one side with a discharge-opening 19, normally closed by a gate 20. Journaled centrally in the receiver 18 is a vertical shaft 21, on which are fixed radial stirrer and scraper arms 22 and a drive-pulley 23. The stirrer-arms revolve with the shaft 21 and operate to keep the cooked seed constantly stirred up in the receiver and to discharge it therefrom when the gate 20 is opened.

The numeral 24 indicates a steam-pipe leading from any suitable source of steam-supply, and leading from said steam-pipe are a number of branch pipes 25, there being one such branch pipe for the steam-jacket of each trough, which are respectively connected at their opposite ends to said steam-jackets. Each of the branch pipes 25 is provided with a valve 26 and is also provided with a pressure-gage 27 for indicating the pressure of the steam in said pipe, and consequently the pressure of the steam in the jacket with which it is connected.

Heretofore it has been a common practice to employ one or more cookers each comprising a heating vessel provided with rotating stirrer-arms. From such a heater a certain amount of the cooked seed is withdrawn from time to time, or sometimes all the cooked seed is so withdrawn, and a fresh charge of cold uncooked seed is introduced into the heater, which coming in contact either with the hot seed partially cooked or the hot surface of the cooker, which is heated by steam at a high pressure, the cooking process is either terminated or partially arrested. This also results in the formation of globules known as "water-balls" in the seed. These water-balls continue to accumulate and grow in size and remain unbroken, and the seed contained in them is not cooked, and the oil contained in them is not extracted. These water-balls pass with the cooked seed into the cake-former and are mashed into the cake and pass in the latter into the press where the oil is extracted, causing black spots whenever the balls occur. These water-balls in the cake not only retain the oil, but deteriorate from the value of the cake. By means of my improved cooker these injurious results are avoided. As described, the steam-jacket of each trough is fed by a separate steam-pipe. In practice the valves 26 are so adjusted that said steam is admitted to the jacket of trough 5 at a comparatively low pressure, to the jacket of trough 6 at a higher pressure, to the jacket of trough 7 at a still higher pressure, and thus at a constantly-increasing pressure to each succeeding jacket in the series. As the seed is fed by the conveyers from one trough to another it is thus subjected to a constantly-increasing temperature, and hence when the fresh seed is introduced through the inlet 3 it meets a low temperature, and this temperature gradually increases as the seed is delivered from one trough to another throughout the series until it is discharged through the outlet 4 into the receiver in a perfectly-cooked condition. This uniform manner of cooking the seed and gradually raising the temperature prevents, in a large measure, the formation of water-balls; but such balls as may occur are effectually crushed and destroyed by the rolls arranged beneath the discharge end of each of the troughs. The crushing-rolls also assist materially in the rupture of the oil-cells in the seed, giving a better yield of oil and making a better cake free from water-balls, resulting in an improved quality of the oil.

By means of the pressure-gages described the operator is enabled to note the pressure of steam carried on each jacket and can regulate the pressure by means of the valves to cause the temperature to be suitable for the nature of the particular seed being cooked, the object being to so regulate the temperature that by the time the seed is discharged into the receiver it will be properly cooked.

It will of course be understood by those skilled in the art that the cotton-seed before it is fed into the cooker is deprived of the hull or husk and that it is the kernels only that are subjected to the cooking operation.

Having described my invention, what I claim is—

1. The process of cooking cotton-seed and the like which consists in subjecting the same to a gradually-increasing heat.

2. The process of cooking cotton-seed and the like, which consists in passing the same over surfaces which are heated to different degrees of temperature.

3. The process of cooking cotton-seed and the like which consists in subjecting the same to a gradually-increasing heat and crushing the same during the heating operation.

4. The process of cooking cotton-seed and the like which consists in subjecting the same to a gradually-increasing heat, crushing the same during the heating operation and stirring the heated mass.

5. In apparatus for cooking cotton-seed and the like, the combination of a plurality of troughs arranged one above the other, each of said troughs provided with a steam-jacket, and each of the jackets adapted to be under higher steam-pressure than the next preceding one for cooking the seed by a gradually-increasing heat, and a pair of crushing-rolls arranged beneath the discharge end of each trough.

In testimony whereof I have hereunto set my hand in presence of two subscribing witnesses.

WALTER H. COOK.

Witnesses:
THOMAS LABATUT,
FELIX J. PUIG.